May 11, 1948.　　　A. J. DUCRUET　　　2,441,348
PROTECTION DEVICE FOR ELECTRIC BATTERIES
Filed March 28, 1945
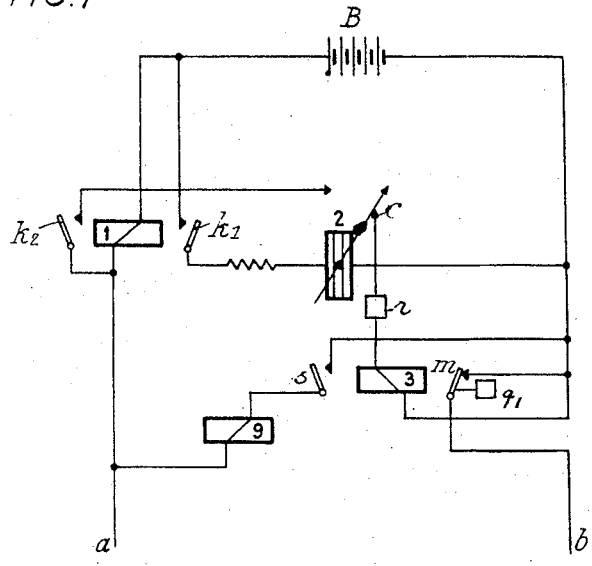
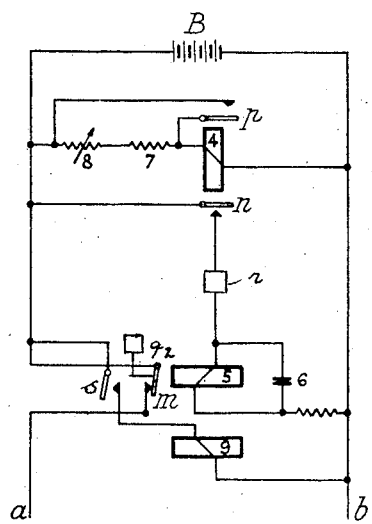
INVENTOR
Arthur Jean Ducruet
By
Ramsey, Kent + Chisholm
ATTORNEYS Patented May 11, 1948

2,441,348

UNITED STATES PATENT OFFICE 2,441,348

PROTECTION DEVICE FOR ELECTRIC BATTERIES

Arthur Jean Ducruet, Paris, France

Application March 28, 1945, Serial No. 585,368
In France February 2, 1944

2 Claims. (Cl. 320—40)

The present invention relates to a protection device for electric batteries.

In a great number of electromechanical plants, for instance of the kind including telephonic switches, signalling means, and so on, use is made of electric batteries, generally of the air depolarization type, intended to supply the necessary voltage to the utilization apparatus. Theoretically, these batteries are not called upon to supply electric current except for very short periods of time, but it occurs frequently that movable parts remain in connection instead of cutting off the circuits at the given times. Accidental overloading of the same kind may also occur for all kinds of reasons. It also happens that, due to an error in operation, the electric circuits are caused to feed electric current into circuits which absorb an excessive amperage.

In all these cases there is a risk of the electric batteries being deteriorated. This is due to the fact that every type of electric battery of the air depolarization type has well defined characteristics, which enable it to feed current either for a very short time with a high amperage which is a function of the volume of oxygen occluded in the positive terminal and of the internal resistance of the battery element, or in a permanent way with an amperage much lower than that above mentioned but also well determined and which is a function of the depolarization rate of the positive terminal.

If the battery is caused to feed current at a high rate for a length of time longer than that for which the battery has been designed, or if it is caused to feed current in a permanent way with an amperage higher than is proper, the internal balance of the elements is broken. The depolarization rate is insufficient and does not permit of freeing the positive terminals from the gases that flow thereto. This terminal is then loaded with noxious elements and if this situation is maintained for a certain time, the battery is slowly asphyxiated.

In both cases, the internal difficulties of the battery cells are indicated by the voltage drop of the battery.

The object of the present invention is to provide a device capable of protecting electric batteries for the feed of electromechanical plants against mistakes of the operator or bad working of parts as might result in an abnormal feed of current by the battery, either in value or in duration.

A characteristic of my invention is that I make use of means operative by the voltage drop that takes place when the battery is in difficulty for remotely operating a circuit breaking switch for cutting off the feed so as to ensure an efficient protection of the battery cells against working incidents involving abnormal discharge conditions.

According to an embodiment of my invention, the protection device includes means, responsive to voltage variations in the circuit, adapted, when this voltage drops below a given value, to operate a circuit breaking relay which opens the utilization circuit, and closes it again either immediately or after a predetermined interval. Besides, this working of the apparatus is repeated as many times as necessary.

The means responsive to voltage variations in the circuit may be inserted permanently between the terminals of the battery to be protected in parallel with the load or it may be comprised of a relay in series with the load which operates when the amperage exceeds the allowable maximum for a permanent delivery of current.

The circuit-breaking relay may cut off the circuit as soon as current is fed to said relay, or only after a certain number of beats of the relay responsive to voltage variations, which last mentioned relay serves in this case to charge a condenser adapted to operate the circuit-breaking relay only when the charge of this condenser has reached a certain value.

In a particular embodiment of my invention, the means responsive to voltage variations in the circuit include, in series therewith, adjustable resistances which can be short-circuited by a contact actuated by this relay itself, in such manner that this relay releases the contact which controls the circuit-breaking relay for a voltage close to that for which this contact is attracted.

In the past it has been the custom to protect batteries or other sources of electric current from overloading by the withdrawal of excessive current by means of a relay adapted to disconnect the load whenever the load current should exceed a predetermined maximum or the supply voltage should fall below a predetermined minimum. This type of protective device is, however, subject to certain limitations since the disconnecting switch must be operated by the coil or coils which detect the overloading. I have therefore provided an electro-mechanical system which includes two relays, the first of which is used for detection and operates a comparably small switch in a cooperating circuit. The operation of the detecting relay energizes a second relay, which may, if desired, be much more powerful than the first relay in its operation, and acts to disconnect the load from the current source.

Other features of the present invention will result from the following detailed description of some specific embodiments thereof.

Preferred embodiments of the present invention will be hereinafter described with reference to the accompanying drawings, given merely by way of example, and in which:

Fig. 1 is a diagrammatic view of a first embodiment of the invention;

Fig. 2 is a similar view of another embodiment.

In the diagram of Fig. 1, I have shown at B the battery which is to feed current to the utilization circuit $ab$. In this circuit is inserted an intensity responsive relay 1, of very low ohmic resistance, which is adjusted to work for a value of the intensity slightly lower than the maximum intensity to be normally supplied by the battery under permanent feed conditions. When the battery is feeding current into the circuit, this relay 1 closes contacts $k_1$ and $k_2$. Contact $k_1$ connects with the terminals of the battery a device 2 adapted to act as a detector, capable of following the variations of voltage of the battery and to close a signalling contact for the value of the voltage that is considered as dangerous. This device may be a contact voltmeter, a voltmetric relay, a tube detector, an electromagnetic relay, etc.

If the voltage drops below a given value, the movable element of the detector closes a contact $c$ which inserts into the circuit a circuit-breaking relay 3. This last mentioned relay, upon being thus energized, attracts a contact $m$, so as to break the feed circuit.

It follows that relay 1 is no longer fed with current and allows contact $k_1$ to open, which breaks the circuit including the detector and the circuit-breaking relay. The latter then allows contact $m$ to close which restores the current of the battery to the transmission line.

According to the conditions of exploitation that are being considered, the circuit-breaking relay may be of the instantaneous working type or it may have its working delayed through any desired time delay means. For purposes of illustration a clock work mechanism of conventional type is indicated schematically at $q_1$ connected to delay the operation of switch $m$.

In the second embodiment of the present, illustrated by Fig. 2, the detecting element 4, constituted as above stated, is connected permanently in series with the battery through a resistance 7 and an adjustable rheostat 8. A contact $p$, adapted to be attracted by relay 4, is so mounted that, in one of its positions, it short-circuits these resistances 7 and 8. Relay 4 also acts upon a contact $n$ which serves to insert into the circuit a circuit-breaking relay 5, capable of cutting off the flow of current through the line.

In the state of rest, all the parts occupy the position shown by the drawing. Contacts $p$ and $n$ are both attracted by relay 4. If the voltage drops in the circuit, for instance as a consequence of the battery having fed current for too long a time, contact $n$ is released. The circuit-breaking relay 5 is then caused to operate.

Contact $p$ has a special function, which is the following:

If element 4 is of the electro-magnetic relay type, it releases its armature for a value of the voltage much lower than that which has caused said armature to be attracted. The arrangement disclosed by Fig. 2 makes it possible however to obtain the release of the armature for a value of the voltage substantially equal to the value of the voltage corresponding to the attraction of the armature.

As a matter of fact, the insertion of resistances 7 and 8 has for its effect to compensate for the increase of the attraction force exerted upon the armature (which results from the reduction of the reluctance of the magnetic circuit) by a decrease of the ampere-turns. Therefore, a very slight drop of the feed voltage will suffice for determining the release of the relay. Rheostat 8 makes it possible to adjust with a high accuracy the release voltage. When contact $p$ closes, the resistances are again short-circuited and the relay is brought back into action. The detecting relay is then caused to work repeatedly at short intervals. For each operation, contact $n$ is also closed and a certain amount of electricity is sent into an electro-chemical condenser 6, connected to the terminals of the circuit-breaking relay 5. When the energy thus stored up in the condenser is sufficient, the circuit-breaking relay is brought into action.

In the same manner as in the arrangement disclosed by Fig. 1, the circuit-breaking relay may be of the instantaneous working type or it may have its working delayed through any desired time delay means. A clockwork mechanism of conventional type is indicated schematically at $q_2$, connected to delay the operation of switch $m$.

As a result of the cutting off of the feed circuit of the system, the intensity drops to zero and the battery voltage immediately rises. The detecting relay 4 is brought back into play and keeps working. The circuit-breaking relay is brought back to the position of rest and the battery is again connected to the terminals of the system to be fed with current.

If the feed conditions again become abnormal, the current is again cut off.

In both of the arrangements above described, a contact $s$ of the circuit-breaking relay serves to feed a registering relay 9 which indicates the number of times the current has been cut off. This registering gives very useful information concerning the difficulties encountered by the battery during the exploitation thereof.

The two embodiments above described can work either with constant voltage (whatever be the temperature of the surrounding atmosphere) or with variable voltage (with a coefficient of variation equal to the temperature coefficient of the battery). To obtain this result, it suffices suitably to choose the ratio of the value of the resistance of the copper relay winding (temperature coefficient equal to 0.004 per degree) (3 or 5) and of the value of an additional constantan or manganese resistance (negligible temperature coefficient) $r$, in series therewith.

From the preceding explanations, it results that, whereas, up to the present time all incidents of operation produced abnormal feed conditions, involving a premature wear of the battery without giving any possibility of detecting these incidents, so that the fault was attributed to the quality of the battery elements, the interposition, between the battery and the load, of a device according to the present invention on the one hand ensures a satisfactory protection of the batteries against overload, and, on the other hand, permits of establishing whether the incidents that occur are due to some failure in the system to be fed with current or to a failure of the battery itself.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In an electro-mechanical system including an electric circuit and a battery supplying current to said circuit, means for protecting said battery against detrimental conditions of operation corresponding to abnormal current output, which means includes circuit-breaking means for disconnecting said battery from said circuit, a condenser connected with said circuit-breaking means so that discharge of said condenser operates said means, and control means, responsive to voltage variations in said circuit for accumulatively charging said condenser every time said voltage drops at least to a given value, whereby said condenser is sufficiently charged after a certain number of operations of said control means for operating said circuit-breaking means.

2. In an electro-mechanical system including an electric circuit and a battery for supplying current to said circuit, a means for protecting said battery against detrimental conditions of operation corresponding to abnormal current output, which means includes: circuit-breaking means for said circuit from said battery; an electro-magnetic control relay, responsive to voltage variations in said circuit for bringing said circuit-breaking means into action after a predetermined drop of voltage, at least one resistance inserted in series with said control relay, and means for short-circuiting said resistance including a contact operative by said control relay itself in such manner as to ensure the working of said control means both to bring said circuit-breaking means into action and to bring it out of action for the same value of the voltage.

ARTHUR JEAN DUCRUET.

REFERENCES CITED

The following references are of record in the file of this patent:

UNITED STATES PATENTS

| Number | Name | Date |
|---|---|---|
| 344,948 | De Solome | July 6, 1886 |
| 653,685 | Maxim | July 17, 1900 |
| 957,321 | Fiedler | May 10, 1910 |
| 1,314,332 | Jones | Aug. 26, 1919 |
| 1,729,871 | Graybill | Oct. 1, 1929 |
| 2,051,514 | Block | Aug. 18, 1936 |
| 2,309,054 | Fell | Jan. 19, 1943 |
| 2,337,713 | Garlington | Dec. 28, 1943 |
| 2,345,510 | Taylor | Mar. 28, 1944 |
| 2,374,251 | Wallace | Apr. 24, 1945 |